United States Patent
McGuire, Jr.

(10) Patent No.: US 6,746,740 B1
(45) Date of Patent: Jun. 8, 2004

(54) PURIFIED LINER AND METHOD FOR MAKING

(75) Inventor: James E. McGuire, Jr., Powell, OH (US)

(73) Assignee: Entrotech, Inc., Columbus, OH (US)

( * ) Notice: Subject to any disclaimer, the term of this patent is extended or adjusted under 35 U.S.C. 154(b) by 0 days.

(21) Appl. No.: 09/726,641

(22) Filed: Nov. 30, 2000

(51) Int. Cl.$^7$ .................................................. B32B 9/00
(52) U.S. Cl. ..................... 428/40.1; 428/41.8; 428/41.9; 428/42.1; 428/352; 428/354
(58) Field of Search .............. 428/40.1, 41.8, 428/41.9, 42.1, 354, 352

(56) References Cited

U.S. PATENT DOCUMENTS

| | | | |
|---|---|---|---|
| 3,907,557 A | 9/1975 | Bolduc | 430/62 |
| 5,916,652 A | 6/1999 | Miner et al. | 428/41.8 |
| 5,954,907 A | 9/1999 | LaRose et al. | 156/275.5 |
| 6,162,534 A | * 12/2000 | Hamerski | 428/354 |
| 6,245,400 B1 | * 6/2001 | Tzeng | 428/40.1 |
| 6,355,322 B1 | * 3/2002 | Golledge | 428/40.1 |

* cited by examiner

*Primary Examiner*—Nasser Ahmad
(74) *Attorney, Agent, or Firm*—Standley Law Group LLP

(57) ABSTRACT

An adhesive-backed flexible seal, label, damping treatment, protective film or gasket, which is suited for use on a metal housing of an electronic component, is carried, prior to application to the housing, on a liner. The liner includes a sheet of flexible liner material. Cleanliness of the release liner is imperative in hard disk drive and semiconductor applications. The present invention includes a purified liner for such use and a method of making the purified liner.

7 Claims, 2 Drawing Sheets

PURIFIED LINER AND METHOD FOR MAKING

TECHNICAL FIELD OF THE INVENTION

The present invention is in the field of release liners used for carrying seal labels and other adhesive coated components used on electronic components.

BACKGROUND AND SUMMARY OF THE INVENTION

At least three properties are desired in a release liner. The liner may have anti-static properties, it may have some indication as to which side of the tape the seal labels should be applied and the liner needs to have a release layer that is clean. The visual indication as to which side of the liner is which is very important and can potentially save a company from making a costly mistake in applying the seal labels to the wrong side of the tape. The cleanliness of the liner is imperative to creating a product with very few contaminants. The major contamination test technique for hard disk drive and semiconductor applications is Dynamic Head Space Gas Chromatograhpy/Mass Spectroscopy (DHS-GC-MS). It is used to identify outgasable components in the ng/cm$^2$ level. Another test that is run on release liners is a solvent extraction test. In a solvent extraction test the extract is analyzed by Attenuated Total Reflectance Fourier Transform Infrared (ATR-FTIR). The amount of siloxane extracted from the liner is then reported in ng/cm$^2$.

The present invention includes an improved purified liner and a method for its preparation. The improved method of the present invention allows for the removal of unwanted non-bonded components in the release coat.

The present invention includes a purified flexible liner material for supporting a pressure sensitive product comprising the following layers:
 a) a support layer having a first and a second side;
 b) a first adhesive disposed on the first side of said support layer;
 c) a first release coating disposed on the first adhesive;
 d) a first polymer film layer disposed on the first release coating;
 e) a second adhesive disposed on the second side of said support layer;
 f) a second release coating disposed on the second adhesive; and
 g) a second polymer film layer disposed on the second release coating.

Included in the present invention is a method of making a purified flexible liner material comprising the steps of:
 a) coating a release coating on a polymer film;
 b) subjecting said polymer film to at least one purification step selected from the group consisting of vacuum deposition of a metal, sputtering a metal and solvent wash, to substantially remove non-bonded impurities; and
 c) coating the purified polymer film with an adhesive.

By exposing the release liner to a vacuum or to heat the outgasable components are removed by evaporation. The solvent wash process is used to remove unwanted non-bonded moieties that are present in an industrial release coat.

Also included in the present invention is a method of making a purified flexible liner material for supporting a pressure sensitive product comprising the steps of:
 a) coating a support layer, composed of a first and second side, with an adhesive, on the first side;
 b) coating the first adhesive with a first release coating;
 c) coating the first release coating with a first polymer film layer;
 d) coating a second release coating, composed of a first and second side, with a second polymer film layer, on the first side;
 e) coating the second release coating with a second adhesive on the second side; and
 f) laminating the second adhesive layer to the second side of the support layer of step a) above, wherein at least one polymer film layer is treated with at least one method selected from vacuum deposition of a metal, sputtering a metal and solvent wash, to substantially remove non-bonded impurities.

BRIEF DESCRIPTION OF THE DRAWINGS

Table 1 shows the results of an analysis of impurities performed by ATR-FTIR, according to one embodiment of the preferred invention.

DETAILED DESCRIPTION OF THE PREFERRED EMBODIMENT(S)

Figure 1:
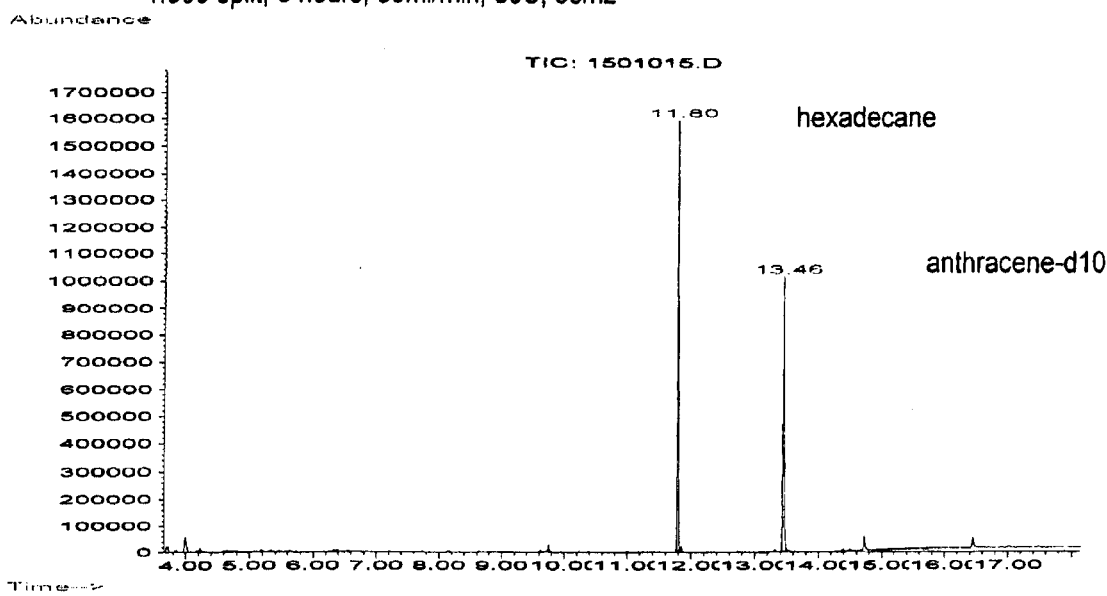
FIG. 1 shows a chromatogram from DHS-GC-MS test, according to one embodiment of the preferred invention.
Figure 1:
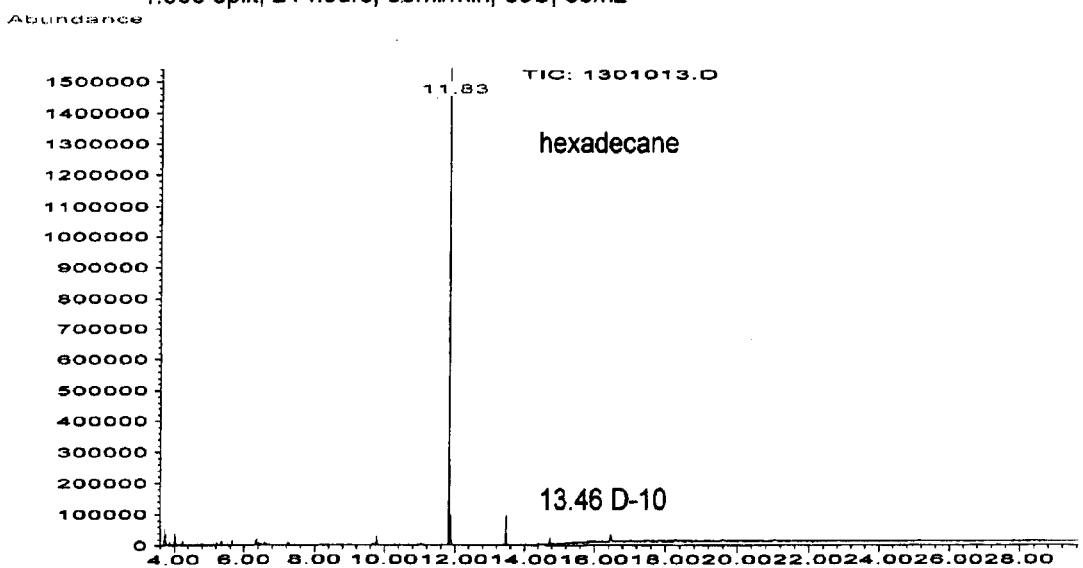
Figure 2:
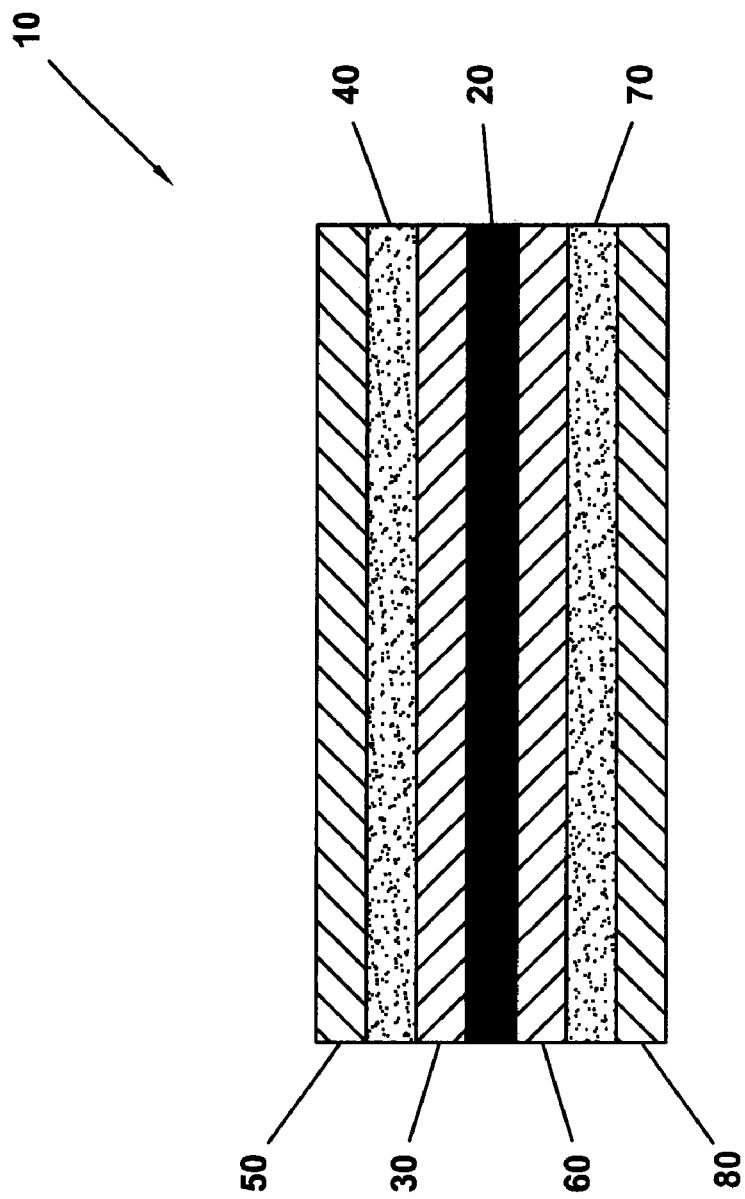
FIG. 2 shows a sectional view of the liner, made in accordance with one embodiment of the present invention, with the thickness of each of the several layers in the liner being exaggerated for illustrative purposes

In accordance with the foregoing summary, the following presents a detailed description of the preferred embodiment of the invention that is currently considered to be the best mode.

The preferred method of preparation of the purified electrostatic dissipative liner 10 for supporting a pressure sensitive product is as follows:
 a) coating a support layer 20, composed of a first and second side, with a first adhesive 30, on the first side;
 b) coating the first adhesive 30 with a first release coating 40;
 c) coating the first release coating 40 with a first polymer film layer 50;
 d) coating a second release coating 70, composed of a first and second side, with a second polymer film layer 80, on the first side;
 e) coating the second release coating 70 with a second adhesive 60 on the second side; and
 f) laminating the second adhesive layer 60 to the second side of the support layer 20 of step a) above, wherein at least one polymer film layer is treated with at least one method selected from vacuum deposition of a metal, sputtering a metal and solvent wash, to substantially remove non-bonded impurities.

Two preferred methods of depositing the conductive metal layer are by sputtering the metal or by vacuum deposition. The method of vacuum metallizing and/or sputter coating subjects the film to heat and/or a vacuum and the volatile impurities can flash off. An additional step that may be employed alone or in combination with either of the above mentioned metal depositing steps, to rid the liner of impurities, is to run the film through a solvent bath or solvent wash process to extract the extractables.

Table 1 shows the results of an analysis performed by ATR-FTIR, a solvent extraction test, on release liners.

Product labeled entrofilm 144 is produced by a method of the present invention.

TABLE 1

| PRODUCT ID | SILOXANE EXTRACTED ng/cm² |
|---|---|
| Competitive A | 571 |
| Competitive B | 1576 |
| entrofilm 472 | 278 |
| entrofilm 144 | Non-Detectable |
| Competitive C | 6210 |
| Competitive D | 3373 |
| Competitive E | 820 |
| Competitive F | 410 |
| Competitive G | 9219 |
| Competitive H | 848 |
| Competitive I | 324 |
| Competitive J | 691 |
| Competitive K | 345 |

The non-bonded impurities in liners of the present invention are present in levels that range from 0 to 100 ng/cm². They are preferably below 50 ng/cm² and most preferably below 20 ng/cm².

FIG. 1 shows a chromatogram from DHS-GCMS (Dynamic Headspace Gas Chromatography-Mass Spectroscopy) of a product of the present invention, entrofilm 144. The peaks on the chromatogram are for the internal standards, hexadecane and anthracene-d10. The outgasable components from the entrofilm 144 are consider non-detectable (ND) and in the level of less than 1 ng/cm².

The support 20 of the present invention is selected from any polymer known and used for polymer supports or carriers. It is preferably a polyester film.

The adhesives 30 and 60 of the present invention are chosen from any adhesives that are known and used in the art for this purpose.

The preferred release coatings 40 and 70 are selected from waxes, carbarmates, acrylates, urethanes, and polydialkyl-siloxanes. Most particularly preferred are those release coatings that use silicone and most particularity, polydimethyl-siloxane.

The polymer film layers 50 and 80 are selected from the group consisting of polyethylene, polypropylene, polyethylene terephthlate and polyethylene naphthalate.

The preferred purified flexible liner material 10 for supporting a pressure sensitive product comprises the following layers:
a) a support layer 20 having a first and a second side;
b) a first adhesive 30 disposed on the first side of the support layer 20;
c) a first release coating 40 disposed on the first adhesive 30;
d) a first polymer film layer 50 disposed on the first release coating 40;
e) a second adhesive 60 disposed on the second side of the support layer 20;
f) a second release coating 70 disposed on the second adhesive 60; and
g) a second polymer film layer 80 disposed on said second release coating 70.

The adhesives 30 and 60 are chosen from any coatings that are known and used for this purpose.

The preferred release coatings 40 and 70 are selected from waxes, carbarmates, acrylates, urethanes, and polydialkyl-siloxanes. Most particularly preferred are those release coatings that use silicone and in particular, polydimethylsiloxane.

The polymer film layers 50 and 80 are preferably selected from the group consisting of polyethylene, polypropylene, polyethylene terephthlate and polyethylene naphthalate.

Any metal known to be a conductive metal may optionally be deposited on the polymer film layer by sputtering the metal or by vacuum deposition. The method of vacuum metalizing and/or sputter coating subjects the film to heat and/or a vacuum and the volatile impurities can flash off. An additional step that may be employed to rid the liner of impurities is to run the film through a solvent bath or solvent wash process to extract the extractables. This solvent wash step may be employed with either methods of metal coating mentioned above or by itself.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or through the use of equivalent method steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A purified flexible liner material for supporting a pressure sensitive product comprising the following layers:
   a) a polymer support layer having a first and a second side;
   b) a first adhesive disposed on said first side of said support layer;
   c) a first release coating disposed on said first adhesive;
   d) a first polymer film layer disposed on said first release coating;
   e) a second adhesive disposed on said second side of said support layer;
   f) a second release coating disposed on said second adhesive; and
   g) a second polymer film layer disposed on said second release coating, wherein said purified flexible liner material comprises no more than about 100 ng/cm² of siloxanes.

2. A purified liner of claim 1 wherein said polymer film layer is selected from the group consisting of polyethylene, polypropylene, polyethylene terephthlate and polyethylene naphthalate.

3. A purified liner of claim 1 wherein said release coating is a silicone release coating composition.

4. A purified liner of claim 1 wherein said release coating is polydimethysiloxane.

5. A purified liner of claim 1 wherein said purified flexible liner material comprises no more than about 50 ng/cm² of siloxanes.

6. A purified liner of claim 1 wherein said purified flexible liner material comprises no more than about 10 ng/cm² of siloxanes.

7. A purified liner of claim 1 wherein said release coating is selected from the group consisting of waxes, carbamates, acrylates, urethanes, and polydialkylsiloxanes.

* * * * *